United States Patent
Taunton

(10) Patent No.: US 7,436,891 B2
(45) Date of Patent: Oct. 14, 2008

(54) BURST MODE MEMORY FETCHES WHEN DECODING COMPRESSED IMAGE DATA

(75) Inventor: Mark Taunton, Milton (GB)

(73) Assignee: Broadcom Corporation, Irvine, CA (US)

( * ) Notice: Subject to any disclaimer, the term of this patent is extended or adjusted under 35 U.S.C. 154(b) by 637 days.

(21) Appl. No.: 10/607,169

(22) Filed: Jun. 27, 2003

(65) Prior Publication Data

US 2004/0086048 A1    May 6, 2004

Related U.S. Application Data

(63) Continuation of application No. 09/438,361, filed on Nov. 12, 1999, now Pat. No. 6,618,440.

(30) Foreign Application Priority Data

Nov. 13, 1998    (GB) .................. 9825004.6

(51) Int. Cl.
*H04N 7/18*    (2006.01)

(52) U.S. Cl. .................. 375/240.25; 375/240.12; 375/240.16; 348/714; 348/715; 348/716; 348/718

(58) Field of Classification Search .......... 375/240.01–240.29; 348/714–720
See application file for complete search history.

(56) References Cited

U.S. PATENT DOCUMENTS

| | | | | |
|---|---|---|---|---|
| 5,581,310 | A | * | 12/1996 | Vinekar et al. .............. 348/718 |
| 5,594,813 | A | * | 1/1997 | Fandrianto et al. .......... 382/236 |
| 6,028,612 | A | * | 2/2000 | Balakrishnan et al. ...... 345/544 |
| 6,079,003 | A | * | 6/2000 | Witt et al. .................... 711/200 |
| 6,079,005 | A | | 6/2000 | Witt et al. |
| 6,205,181 | B1 | * | 3/2001 | Hu et al. ................ 375/240.26 |
| 6,222,883 | B1 | | 4/2001 | Murdock et al. |

FOREIGN PATENT DOCUMENTS

EP    0 714 211    5/1996

* cited by examiner

*Primary Examiner*—Andy S Rao
(74) *Attorney, Agent, or Firm*—Sterne, Kessler, Goldstein & Fox PLLC

(57) ABSTRACT

An image data decompression apparatus for decoding blocks of motion compensated non-intra coded data uses a memory (14) storing reference picture data. A decoding processor (12) decodes a current block of a generated picture using lines of previously decoded image data from the memory (14) that are selected in dependence upon a motion vector ($V_1$) for the current block. In order to improve access efficiency to the memory (14) the decoding processor (12) concatenates fetches into bursts for different sections of lines of previously decoded data that lie within a predetermined range within the memory addresses of the memory (14).

14 Claims, 4 Drawing Sheets

BURST MODE MEMORY FETCHES WHEN DECODING COMPRESSED IMAGE DATA

CROSS-REFERENCE TO RELATED APPLICATIONS

This application is a continuation of U.S. patent application Ser. No. 09/438,361, filed Nov. 12, 1999, now U.S. Pat. No. 6,618,440, which claims priority to Great Britain Patent Application No. 9825004.6, filed Nov. 13, 1998.

This invention elates to the field of decoding motion compensated non-intra coded compressed image data. An example of such data is non-intra coded portions f an MPEG data stream.

Conventional hardware based MEG decoders operate on a block-by-block basis to decode the data stream. More particularly, for a non-intra coded block, predictive coding is used whereby reference needs to be made to previous image data (within a reference picture) together with the compressed data to reconstruct the block presently being decoded (within a generated picture). Typically, an area of picture data in the reference picture that matches (within limits) the block being decoded was identified during the compression process and can be referenced using a motion vector pointing to the area of previously decoded data during decompression. Once the present block has been decompressed, the hardware can start decompressing the next block.

Whilst the above described techniques yield a high degree of compression, a problem that arises is the disadvantageously Sequent need to make memory accesses to reference picture data as part of the decompression process. In modem memory systems, such as SDRAM, there is a relatively high degree of latency associated with each new burst mode memory access. For example, it may take seven memory clock cycles to recover the first data word in a burst with each remaining data word then being returned in every further memory clock cycle. Accordingly, a memory access to five data words would take eleven memory clock cycles (7+4). This represents an efficiency of less than 50% relative to the peak bandwidth of the memory system. Measures that can improve the efficiency of operation of memory access within such decoding systems are advantageous as they reduce the time taken to perform the decoding and release memory bandwidth that can be usefully employed elsewhere.

Viewed from one aspect the present invention provides apparatus for decoding blocks of motion compensated non-intra coded compressed image data, said apparatus comprising:

a memory for storing previously decoded image data;

a decoding process r responsive to a motion vector of a block being decoded for fetching previously decoded image data from said memory for use in decoding said block; wherein decoding of a motion vector for a block being decoded takes place before a fetch is made for decoding of a preceding block; and said decoding processor concatenates fetches for at least one line of previously decoded data for different blocks being decoded into burst mode fetches.

The invention recognizes that whilst the decoding may take place on a block-by-block basis, the etching of previously decoded image data need not be broken down into such a block-by-block process. Furthermore, the invention recognizes that in many cases there will be a strong correlation between the previously decoded image data fetched for the preceding block and the previously decoded image data fetched for the current block. In these circumstances it is possible to concatenate at least one of the memory fetches (which may be a burst for each line of each area in the reference picture) thereby greatly increasing the efficiency of use of the memory access channels.

Whilst memory fetches might be concatenated only in the circumstances where they exactly abutted, a net overall gain can be made even when there are spaces between the memory fetches providing these spaces are not so large as to negate the avoidance of an additional memory latency cycle. The fetches can also be combined when they overlap to even greater advantage since duplicated fetches are eliminated, or when they are in reversed order . Accordingly, in preferred embodiments of the invention said processor concatenates fetches to memory addresses within a predetermined range of each other.

It will be appreciated that the block being decoded could have an individual motion vector and be completely independent of all other blocks. However, improved compression of the source data can be achieved when the individual blocks are processed as parts of a macroblock sharing a common motion vector or motion vectors (e.g. as in MPEG data). In this case the block of data being decoded could be a macroblock or a section of a macroblock composed of several smaller blocks.

A convenient way for determining whether fetches can be concatenated in preferred embodiments is one in which if said motion vectors decoded for successive blocks are within a predetermined range of one another then said fetches are concatenated.

Whilst the invention can be usefully employed in many different types of memory system, it is particularly useful when the memory is a memory having a first access time for a first access in a burst and a subsequent access time for each subsequent accesses within said burst, said first access time being greater than said subsequent access time. SDRAM memory is a common example of such a memory which has a high latency for the first access and yet is highly efficient for subsequent accesses within a burst. Accordingly, decoder implementations employing this type of memory particularly benefit from the use of the present invention.

Whilst the invention could be embodied purely in hardware, the invention is particularly suitable for systems in which software decoding of die compressed image data occurs. Software decoding generally allows a greater degree of flexibility in the ordering of the operations to be performed and so allows motion vector identification, comparison and fetching to be performed for a subsequent block before the preceding block is finally dealt with. Software embodiments also make the dynamic alteration of the processing parameters (e.g. the range over which fetches are concatenated) easier to achieve. For example, software can be made to automatically adjust itself to the surrounding hardware environment.

The image data that is decompressed could have many different formats. However, the invention is particularly useful when the image data is compressed HDTV image data. Such HDTV image data typically contains a high number of blocks sharing very similar motion vectors for which the fetches can be concatenated.

The invention is also well suited to systems in which the reference picture data is accessed at reduced resolution to produce the generated picture. Examples of this are producing a standard resolution (SDTV) picture from HDTV data or a PIP (picture-in-picture) scaled-down display from full screen resolution (SDTV or HDTV) data. In such reduced resolution memory accesses, the bursts scaled-down for an individual block are shorter and less efficient making the invention more useful.

The splitting of the various tasks to be performed in the decompression of a block of compressed data may be efficiently performed in preferred embodiments in which a data steam parsing processor parses said compressed image data to extract parsed data including a required fetch and other data representing each block and transfers said parsed data to said decode processor which decompresses each block The parsing processor and the decoding processor could be the same hardware at different stages of the operation.

A pre-fetch buffer between the main memory and the decode processor may be used to further improve the efficiency of operation of the system.

Viewed from another aspect the present invention provides a method of decoding blocks of motion compensated non-intra coded compressed image data, said method comprising the steps of:

storing previously decoded image data in a memory;

in response to a motion vector of a block being decoded, fetching previously decoded image data from said memory for use in decoding said block; wherein decoding of a motion vector for a block being decoded takes place before a fetch is made for decoding of a preceding block; and fetches for at least one line of previously decoded data for different blocks being decoded are concatenated into burst mode fetches.

An embodiment of the invention will now be described, by way of example only, with reference to the accompanying drawings in which.

Figure 3:
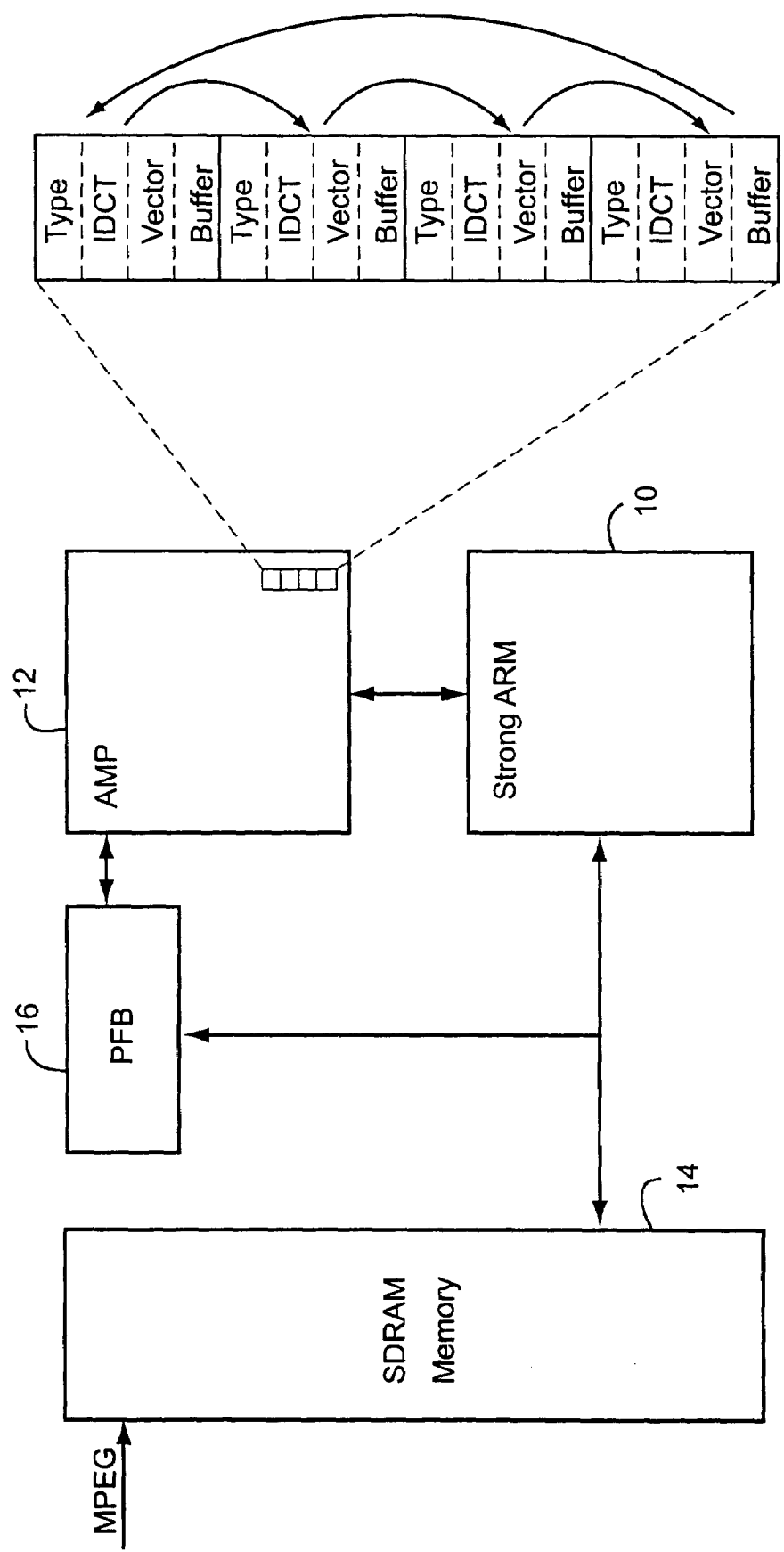
Figure 5:
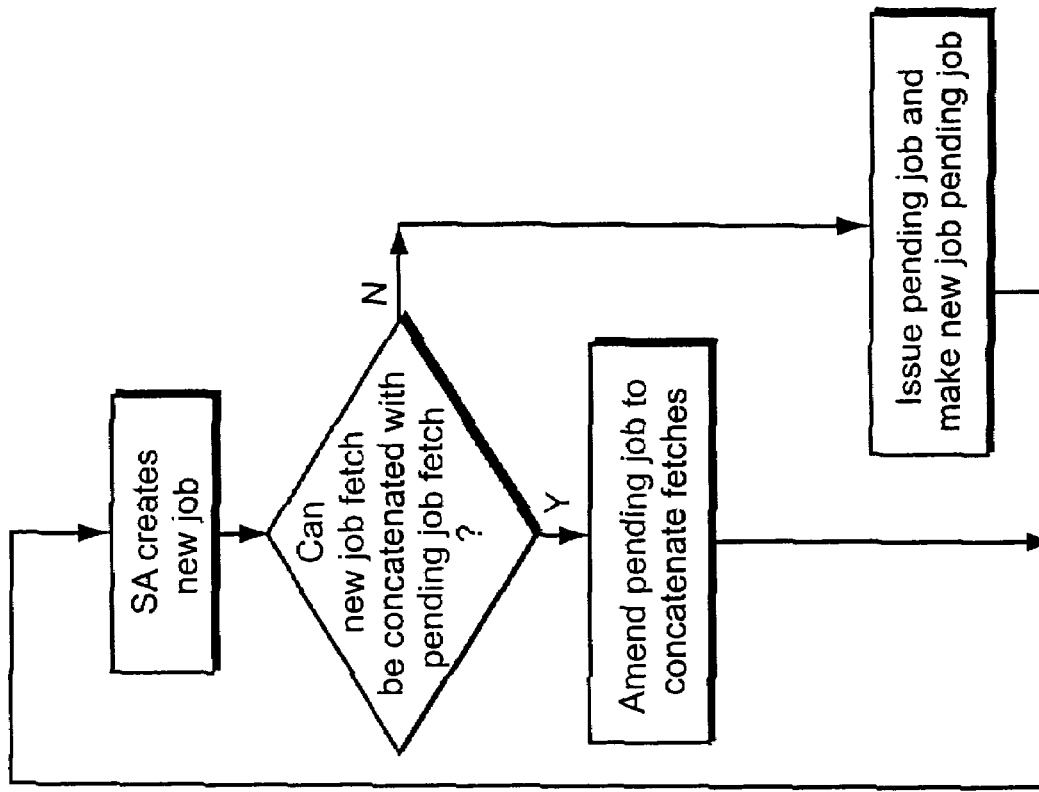
Figure 4:
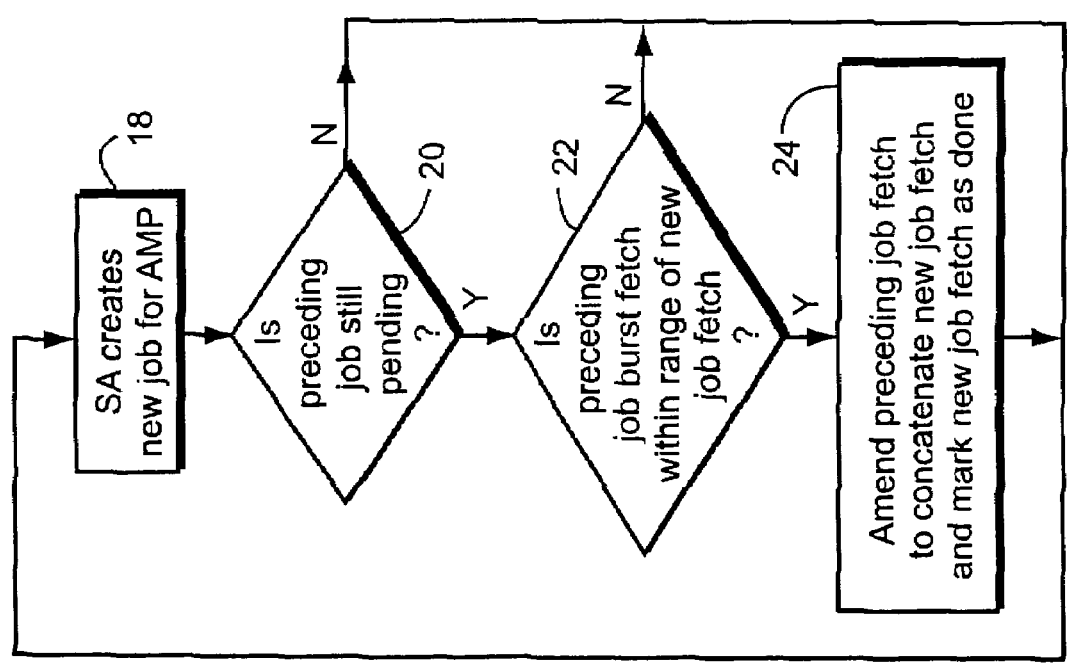

FIG. 3 schematically illustrates an apparatus for performing image data decompression; and FIGS. 4 and 5 are flow diagrams illustrating the concatenation f burst mode fetches.

Figure 1:
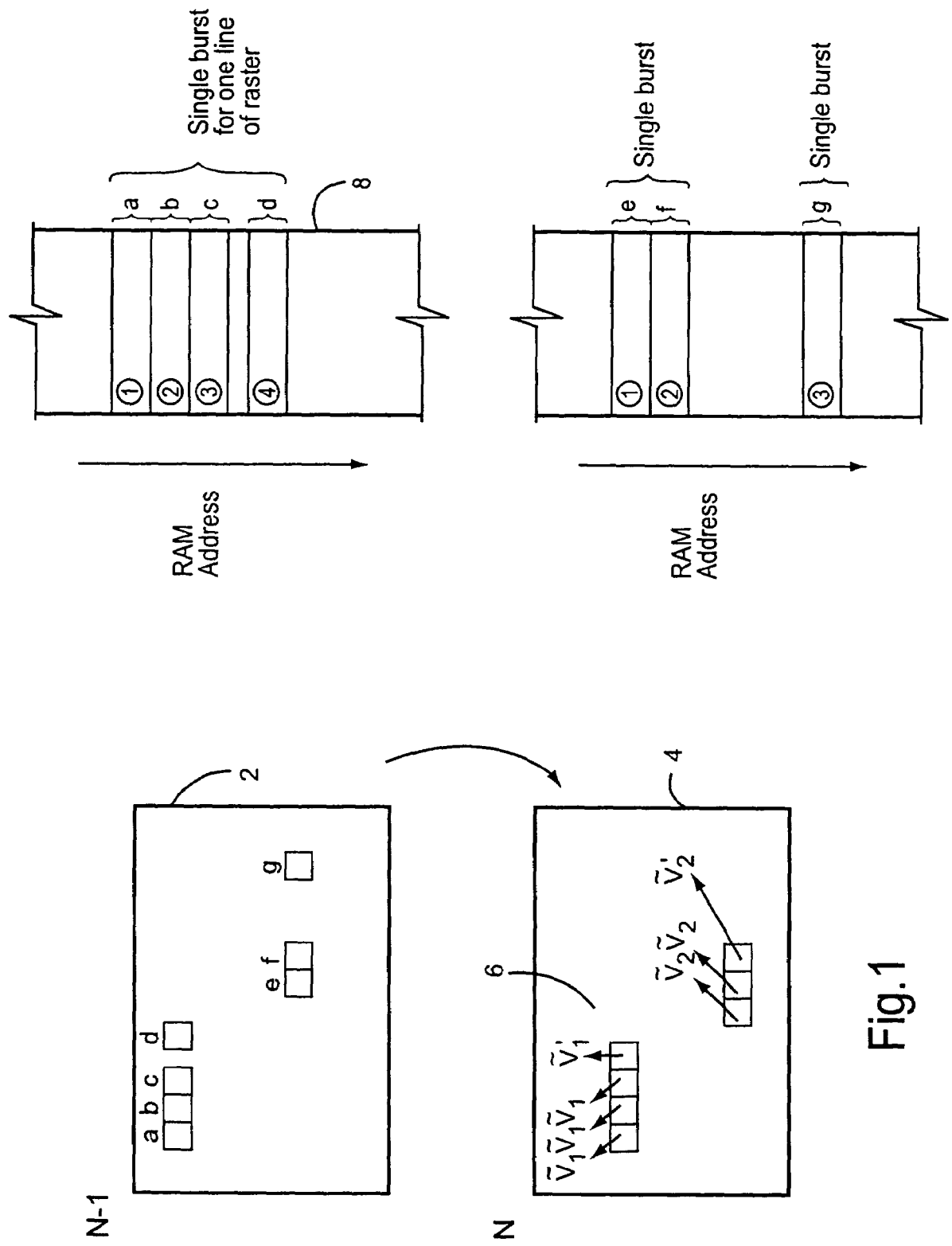
FIG. 1 illustrates frames of image data containing blocks of pixels that have been or are to be decompressed together with associated portions of a memory storing the previously decoded image data needed for decompression of those blocks, from a previously decoded image frame.

FIG. 1 shows a frame 2 of image data identified a frame N-1. This frame 2 has already been decompressed. The next frame of image data 4 identified as frame N is composed of a plurality of blocks of pixels 6 that each have associated with them a motion vector indicating a substantially matching area within the preceding image frame 2. Depending upon the motion of the differ portions of the image, different blocks will have different associated motion vectors. In the example illustrated, the four blocks in the upper portion of the image frame 4 are substantially matched (via slightly different motion vectors) to the blocks a, b, c and d from the image frame 2. The blocks a, b, c and d in image frame 2 ant abutting or close to one another and the memory addresses storing individual lines within these areas of image data are abutting or close to one another as illustrated in the portion of memory 8. In practice differences in the vertical motion vector component have a greater effect in spreading out the reference picture data in the memory as some of the data may move onto different scanning lines which are not adjacent. The present invention recognizes that a gain in efficiency may be made by concatenating the burst mode fetches for the data representing the lines within the areas a, b, c and d into respective single bursts. A portion of the data from each single burst can be used for decompressing lines of each of the corresponding blocks within the image frame 4.

In the case of the three blocks illustrated in the bottom portion of the image frame 4, these are abutting but one has a significantly different motion vector. The lines corresponding to the previously decoded area g are too far from the memory locations of the lines for the areas e, f for it to be a gain in efficiency to concatenate these burst mode fetches into the burst mode fetches with the others. The unused data in the gap between the desired data would take longer to retrieve from memory than would the latency associated with starting a separate burst mode request just to fetch the data of the lines of the area g.

It will be seen from the above that concatenating burst mode memory requests does not produce an increase in efficiency in every case. Accordingly, the statistics of the memory fetches for a given implementation need to be examined and an appropriate threshold set for the maximum distance between desired data within the memory for which it is worth concatenating the burst mode fetches. A further parameter would be the number of blocks over which it was worth seeking to concatenate memory requests. Generally speaking concatenating memory requests over two or tree blocks is likely to gain the majority of the efficiency improvements without causing undue timing difficulties or requiring excessive amounts of data buffering due to uncompleted decompression of pending blocks.

Figure 2:
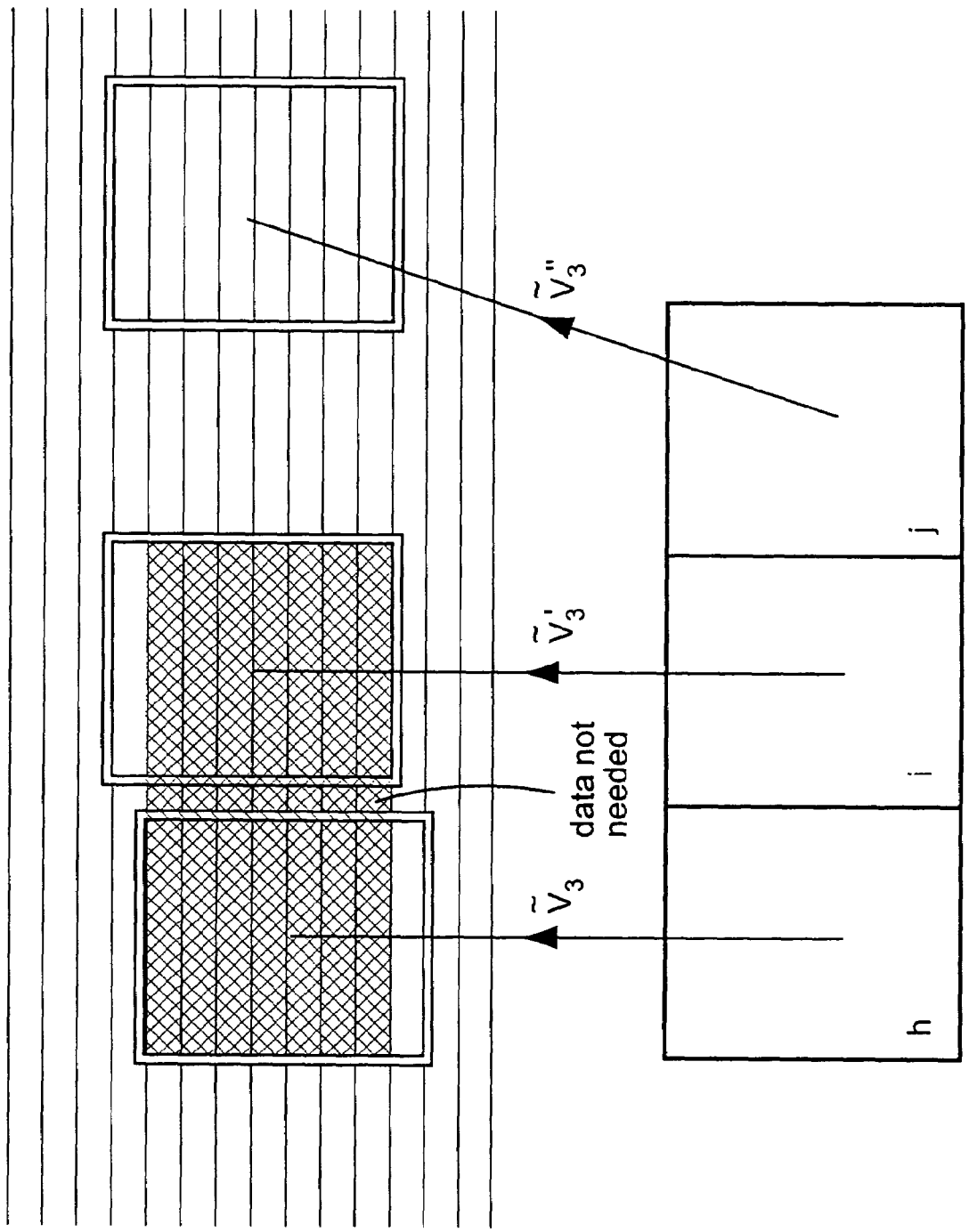
FIG. 2 shows the lines making up the previously decoded areas of a reference image.

FIG. 2 illustrates the relationship between the lines forming previously decoded image data and blocks within data to be decoded. The motion vectors identified for the blocks h, i and j point to matching areas within the previously decoded data. The previously decoded data is stored in a raster line form within a memory and so line portions adjacent in the raster line direction in the previously decoded image will also be adjacent within the memory locations of the memory. Such adjacent line portions are suitable for concatenation with burst mode fetches. Even if two vectors have different components perpendicular to the raster direction (e.g. the vectors for blocks h and i) some of the lines of data values needed for decoding each block may still be adjacent (or sufficiently close) in the memory address space to be worthwhile concatenating. This region is shown cross-hatched in FIG. 2. The lines of data values for block j are too far away to be worthwhile concatenating even though they are in the same raster lines as the data for block i.

FIG. 3 illustrates a data decompression apparatus formed of a microprocessor 10 that serves the role of a data stream parsing processor amongst other functions. This microprocessor 10 is linked to a media processor 12 that performs the function of the decode processor. The media processor 12 is a special purpose processor optimized to perform motion-compensated IDCT decompression amongst other functions. One mode of use relating to scaled-down reproduction would be to decompress the data to reduced resolution, e.g. producing a 4×4 decoded block for each compressed block representing an 8×8 image. The microprocessor 10 parses the received MPEG data stream and splits out of it the macroblock type (e.g. inter or intra), the IDCT coefficients, the associated motion vector and the burst mode fetch requirements for previously decoded data. The media processor 12 contains four job storage locations where four pending block decompressions may be specified prior to being actioned by the media processor 12 (fewer or more job storage locations could also be used). Each of these block decompressions includes the data extracted by the microprocessor 10 from the data stream. The media processor 12 executes each decompression in turn in a repeating cycle. The data fetched by the media processor 12 from the main memory 14 is stored in a pre-fetch buffer 16 to which rapid access may be gained.

The microprocessor 10 sets up the jobs within the media processor 12 and in many circumstances can got well ahead of the processing being performed by the media processor 12. In these circumstances, when a subsequent block is parsed the opportunity arises for the information gained from parsing this subsequent block to be used to modify the preceding job in a way that will improve overall efficiency. FIG. 4 illustrates an example of this.

At step 18 the microprocessor 10 (a StrongARM microprocessor) creates a new job for the media processor (AMP) 12. At step 20 the microprocessor 10 checks to see if the preceding job within the media processor 12 is still pending, i.e. has not yet been started. If the preceding job is still pending, then at step 22 a check is made to determine whether the burst fetch for the preceding job is within a predetermined range of memory addresses to that of the present job. This determination could take place by comparing the motion vectors or could take place by directly comparing the derived memory addresses storing the previously decoded data required.

If the previously decoded data required by the new job is within a relatively small address-distance of the burst fetch for the preceding job, then at step 24 the microprocessor 10 modifies the burst fetch specifying data within the preceding job to concatenate within it the new job fetch and marks the new job fetch as done. Accordingly, when the preceding job is eventually executed by the media processor 12, the previously decoded data required for both blocks will be fetched in a single burst and placed in the pre-fetch buffer 16 where it will be available for use by the media processor 12 in combination with the IDCT coefficients. If the determination at either step 20 or step 22 is negative and after execution of step 24, the processor returns to step 18.

It will be appreciated that the microprocessor 10 performs many other functions and the process illustrated in FIG. 4 is only one of the various tasks that it interleaves.

Whilst in the above embodiment the microprocessor 10 has been illustrated as modifying the jobs set up within the media processor 12 to concatenate burst mode fetches, an alternative embodiment might employ the media processor 12 itself to examine succeeding jobs when executing a current job to determine if the bum mode fetch could be concatenated into the currently executing job.

Another alternative and one that in some circumstances may be beneficial is to have the microprocessor 10 delay issuing a processing job to the media processor 12 until it has determined whether or not the fetch for the succeeding block can be usefully concatenated with that of the pending processing job. If the fetch is to memory locations within a predetermining range, then the fetch is concatenated. This process continues until a maximum number of fetches have been concatenated or a fetch out of range to be concatenated is encountered. At this point the pending job is issued to the media processor 12. This processing is illustrated in FIG. 5.

The invention claimed is:

1. A method of decoding a block of compressed image data, the method comprising:
   recognizing a correlation between first previously decoded image data required to decode the block and second previously decoded image data that is not required to decode the block; and
   selectively concatenating a fetch of the first previously decoded image data and a fetch of the second previously decoded image data based on a first address of the first previously decoded image data and a second address of the second previously decoded image data having a proximity within a predetermined range.

2. The method of claim 1 further including:
   decoding a first motion vector required to decode the block; and
   decoding a second motion vector that is not required to decode the block, and said selectively concatenating includes selectively concatenating in response to decoding the first motion vector and decoding the second motion vector.

3. The method of claim 2, wherein said selectively concatenating includes selectively concatenating in response to the first motion vector being within a predetermined proximity of the second motion vector.

4. The method of claim 1 further including decoding compressed HDTV image data to provide the first previously decoded image data and the second previously decoded image data.

5. The method of claim 1, wherein said selectively concatenating includes selectively concatenating the fetch of the first previously decoded image data and the fetch of the second previously decoded image data to provide a concatenated burst mode fetch, and the method further includes accessing a memory having a first access time for a first access of the concatenated burst mode fetch and a second access time less than the first access time for subsequent accesses of the concatenated burst mode fetch.

6. The method of claim 1, wherein said recognizing includes recognizing the correlation between the first previously decoded image data having a first resolution and the second previously decoded image data having the first resolution, wherein the first resolution is a lower resolution than standard decompression of the compressed image data would produce, and the method further includes fetching the first and second previously decoded image data at the first resolution.

7. The method of claim 1 further including storing the first previously decoded image data and the second previously decoded image data in a pre-fetch buffer in response to said selectively concatenating the fetch of the first previously decoded image data and the fetch of the second previously decoded image data.

8. An apparatus to decode a block of compressed image data, the apparatus comprising:
   a memory to store first previously decoded image data required to decode the block at a first address and second previously decoded image data that is not required to decode the block at a second address; and
   a processor to recognize a correlation between the first previously decoded image data and the second previously decoded image data and to selectively concatenate a fetch of the first previously decoded image data and a fetch of the second previously decoded image data based on the first address and the second address having a proximity within a predetermined range.

9. The apparatus of claim 8, wherein the processor selectively concatenates the fetch of the first previously decoded image data and the fetch of the second previously decoded image data in response to decoding a first motion vector required to decode the block and a second motion vector that is not required to decode the block.

10. The apparatus of claim 9, wherein the first motion vector is within a predetermined proximity of the second motion vector.

11. The apparatus of claim 8, wherein the compressed image data is compressed HDTV image data.

12. The apparatus of claim 8, wherein the processor selectively concatenates the fetch of the first previously decoded image data and the fetch of the second previously decoded image data to provide a concatenated burst mode fetch, and the memory has a first access time for a first access of the concatenated burst mode fetch and a second access time less than the first access time for subsequent accesses of the concatenated burst mode fetch.

13. The apparatus of claim 8, wherein the first previously decoded image data and the second previously decoded image data have a first resolution, wherein the first resolution is a lower resolution than standard decompression of the compressed image data would produce, and the processor selectively concatenates the fetch of the first previously decoded image data and the fetch of the second previously decoded image data to provide a concatenated fetch, and the concatenated fetch is performed at the first resolution.

14. The apparatus of claim 8 further including a pre-buffer to store the first previously decoded image data and the second previously decoded image data in response to the processor selectively concatenating the fetch of the first previously decoded image data and the fetch of the second previously decoded image data.

* * * * *